(12) United States Patent
Scaglione (10) Patent No.: US 12,445,393 B2
(45) Date of Patent: Oct. 14, 2025

(54) HARDWARE-TRIGGERED TRAFFIC MIRRORING

(71) Applicant: Hewlett Packard Enterprise Development LP, Houston, TX (US)

(72) Inventor: Giuseppe Scaglione, Granite Bay, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 358 days.

(21) Appl. No.: 17/877,449

(22) Filed: Jul. 29, 2022

(65) Prior Publication Data
US 2024/0039868 A1  Feb. 1, 2024

(51) Int. Cl.
*H04L 49/20* (2022.01)
*H04L 43/10* (2022.01)
*H04L 43/12* (2022.01)
*H04L 49/351* (2022.01)

(52) U.S. Cl.
CPC ............ *H04L 49/208* (2013.01); *H04L 43/10* (2013.01); *H04L 43/12* (2013.01); *H04L 49/351* (2013.01)

(58) Field of Classification Search
None
See application file for complete search history.

(56) References Cited

U.S. PATENT DOCUMENTS

| | | | | |
|---|---|---|---|---|
| 9,331,915 | B1* | 5/2016 | Brandwine | H04L 43/028 |
| 2014/0177428 | A1* | 6/2014 | Sinha | H04L 43/12 |
| | | | | 370/216 |
| 2016/0087916 | A1* | 3/2016 | Janardhanan | H04L 63/1408 |
| | | | | 370/390 |
| 2021/0036942 | A1* | 2/2021 | Ghanwani | H04L 43/16 |
| 2021/0320887 | A1* | 10/2021 | Chen | H04L 49/9084 |

OTHER PUBLICATIONS

Beningo, Jacob, Reusable Firmware Development, Apress, 2017 (Beningo). DOI: https://doi.org/10.1007/978-1-4842-3297-2. (Year: 2017).*

Stringham, Hardware/Firmware Interface Design, Elsevier Inc. (2010). https://doi.org/10.1016/B978-1-85617-605-7.00001-0. Only the most relevant portion, Chapter 9 on Interrupts, is provided herewith. (Year: 2010).*

* cited by examiner

*Primary Examiner* — Ayaz R Sheikh
*Assistant Examiner* — Christopher R Davis
(74) *Attorney, Agent, or Firm* — Yao Legal Services, Inc.

(57) ABSTRACT

A system for facilitating packet mirroring triggered by a hardware module of a switch is provided. During operation, the hardware module can process a received packet and determine whether the processing of the packet changes a state of the hardware module. If a change to the state is detected, the hardware module can determine whether the changed state of the hardware module satisfies a trigger condition for initiating packet mirroring, and if does, issue a hardware interrupt. The system can then identify a set of packets that are to be mirrored based on one or more mirroring parameters indicated by the trigger condition. Here, the set of packets are subsequent to the packet and to be processed by the hardware module. Accordingly, the system can mirror the set of packets to a target. If the trigger condition is expired, the system can terminate the mirroring of the set of packets.

18 Claims, 8 Drawing Sheets

HARDWARE-TRIGGERED TRAFFIC MIRRORING

BACKGROUND

Field

The present disclosure relates to communication networks. More specifically, the present disclosure relates to a method and system for triggering traffic mirroring by the hardware of a switch.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought a progressively increasing amount of network traffic. As a result, equipment vendors race to build switches with versatile capabilities. To do so, a switch may support different protocols and services. Furthermore, the switch can participate in different types of networks while operating in different roles. For example, the switch can operate as a tunnel endpoint (e.g., a virtual tunnel endpoint (VTEP) for a virtual extensible local area network (VXLAN) tunnel) in an overlay network while operating as a physical switch in the underlay network.

Since a switch may support different types of operations and participate in different types of networks, performance issues with the switch often require extensive analysis of how the switch processes packets. To facilitate the extensive analysis, the switch can support traffic mirroring, which can be used to analyze events impacting the performance of the switch. Traffic mirroring can involve generating a copy of a set of packets received at the switch and sending the copied packets to a target for further inspection. These packets can be mirrored based on a set of rules. For example, packets can be mirrored based on the ingress port or egress port, virtual local area network (VLAN) membership, or packet-specific attributes, such as media access control (MAC) addresses, Internet Protocol (IP) addresses, or protocol indicators.

The aspects described herein solve the problem of efficiently and timely triggering traffic mirroring at a switch by (i) monitoring the hardware (e.g., the switching circuitry) of the switch for a trigger condition; (ii) if an event detected at the hardware satisfies the trigger condition, issuing an interrupt from the hardware indicating the triggering of the traffic mirroring; and (iii) mirroring a set of packets associated with the trigger condition to a local or remote target. Since the event is detected at the hardware, a few packets processed by the hardware after the trigger can be indicative of the issue that caused the trigger condition (e.g., a congested queue). As a result, traffic mirroring for a small duration can be sufficient to determine the cause of the trigger condition. In this way, the hardware-triggered packet mirroring can allow the discovery of the properties of the event with a relatively low volume of mirrored traffic.

With existing technologies, mirroring is often used to inspect packets to resolve an issue (e.g., performance, security, etc.) without interrupting the flow of traffic. Typically, packets can be mirrored based on a condition. For example, the switch can mirror the packets arriving at an ingress port or sent via an egress port, traffic of a VLAN, or packet-specific features, such as protocol information or MAC and IP addresses. The mirrored traffic can then be sent to a traffic analyzer (e.g., Wireshark, SolarWind Analyzer, and ManageEngine). A network administrator can then analyze events indicated in the data presented by the traffic analyzer and perform a mitigating action.

However, identifying when to initiate and terminate the mirroring process can be challenging. In particular, with high-speed connections, mirroring can generate a significant amount of redundant data at a switch even for a small period. For example, since the administrator may not have prior knowledge of an event due to the dynamic and random nature of a network, the administrator may configure the switch to mirror for at least a few seconds. However, mirroring packets from a congested 10 Gbps uplink for ten seconds can produce 12.5 GB of redundant data. Furthermore, processing such a large amount of data may cause a significant load for the processor of the switch. In addition, a large subset of the redundant data may not have information indicative of an issue in the network. As a result, without a quick and efficient trigger, traffic mirroring can generate a large volume of irrelevant data. To solve this problem, the hardware of the switch (e.g., the application-specific integrated circuit (ASIC) of the switch) can trigger the mirroring process. As a result, the initiation and termination of the mirroring process can be driven by the current flow of traffic through the hardware. Hence, based on the hardware triggers, the mirroring process can be selectively enabled and disabled traffic based on a specific event. In other words, if the event changes a state of a particular component of the hardware module, the corresponding trigger condition can be checked. For example, the utilization of a queue reaching a threshold can trigger the mirroring of packets coming to the queue. Similarly, the temperature of the processor following a pattern can trigger the mirroring of traffic with security risks. The changed state can correspond to a performed operation at the hardware module (e.g., a queue receiving a packet or a port learning a MAC address).

Since an event at the hardware triggers the mirroring process, a few subsequent packets can be indicative of the issue causing the event. Consequently, the duration of a traffic mirroring event can be relatively small (e.g., for a second). Furthermore, a trigger based on a hardware interrupt can be intercepted by the processor of the switch. As a result, the mirroring process of the switch, which can run based on the instructions processed at the processor, can quickly initiate a corresponding traffic mirroring event. In this way, the hardware-triggered traffic mirroring can facilitate a timely and efficient trigger for traffic mirroring that results in a relatively low volume of relevant data.

During operation, the hardware of the switch, which can be referred to as a hardware module, can monitor the corresponding states associated with different components of the switch. If the state of a component changes, the hardware module can determine whether the change of the state satisfies a trigger condition for initiating traffic mirroring associated with the component. Examples of a trigger condition can include, but are not limited to, a link coupled to a network port becoming enabled, the packet counter for a port reaching a threshold value, the packet rate at the port reaching a threshold value, the port learning a new MAC address, a MAC address moving to a new port (i.e., the MAC address previously learned at a port is re-learned at the new port), a new IP flow is learned (e.g., based on source and destination IP addresses), detecting a policy match (e.g., matching a particular source and/or destination IP address), a network queue (or buffer) utilization reaching a threshold level, and the temperature of the processor reaching a threshold.

If the trigger condition is satisfied, the hardware module can issue an interrupt for the traffic mirroring process of the switch. Upon detecting the interrupt, the mirroring process running on the processor of the switch can initiate a mirroring event, which mirrors a set of packets based on one or more mirroring parameters indicated by the trigger condition. Examples of the mirroring parameters can include, but are not limited to, the duration of the mirroring event, the number of packets to be mirrored, identifying information of the packets to be mirrored, and a class of traffic to be mirrored. The identifying information can include an ingress or egress port of the packet, VLAN identifier of the packet, and MAC and IP addresses of the packet. Respective copies of the set of packets can be generated by the switch and sent to a target, such as a remote network management device or the processor of the switch.

When the trigger condition expires, the mirroring event can be terminated. The expiration of the trigger condition can be indicated by the expiration of a predefined duration of the mirroring event or the detection of a termination event at the hardware module. With the time-based approach, the mirroring process can mirror the traffic traversing a queue that may have caused an event (e.g., traffic across a congested queue) for a relatively small duration when the congestion event has occurred. On the other hand, examples of a termination event include, but are not limited to, the utilization of the queue, the temperature of the processor, and the packet rate at a port dropping below respective low watermarks. In this way, the hardware-triggered traffic mirroring can generate a relatively low volume of issue-specific mirrored data.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Figure 1A:
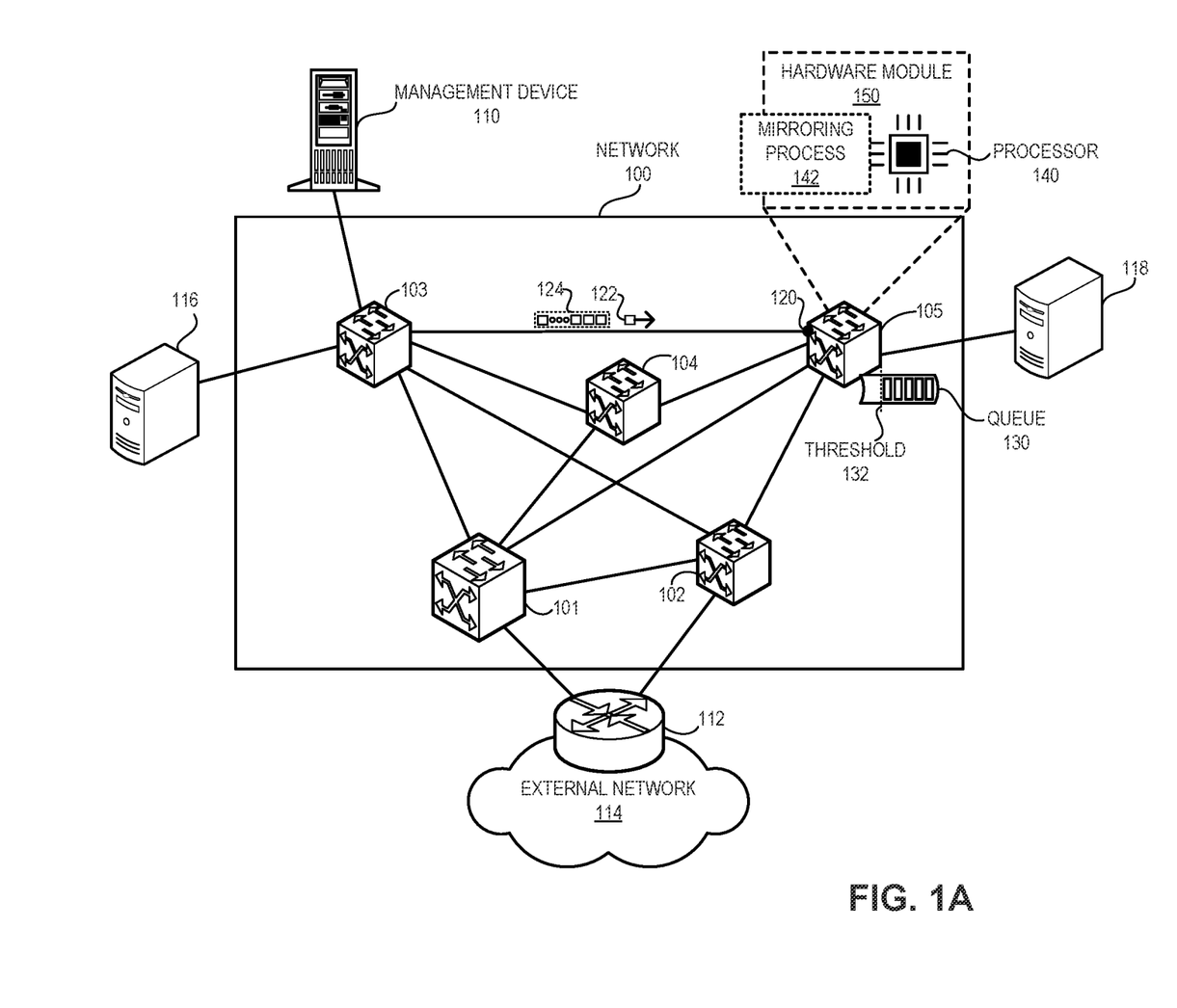
FIG. 1A illustrates an example of hardware-triggered traffic mirroring in a network, in accordance with an aspect of the present application.

FIG. 1A illustrates an example of hardware-triggered traffic mirroring in a network, in accordance with an aspect of the present application. A network 100 can include a number of switches and devices, and may include heterogeneous network components, such as layer-2 and layer-3 hops, and tunnels. In some examples, network 100 can be an Ethernet, InfiniBand, or other networks, and may use a corresponding communication protocol, such as Internet Protocol (IP), FibreChannel over Ethernet (FCoE), or other protocol. Network 100 can include switches 101, 102, 103, 104, and 105, each of which can be associated with a MAC address and an IP address. End devices 116 and 118 are coupled to switches 103 and 105, respectively.

A respective link in network 100 can be a physical link or a tunnel spanning one or more physical links. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). A respective switch pair in network 100 can be a BGP peer. Network 100 can be coupled to an external switch 112, which can couple network 100 to an external network 114.

With existing technologies, traffic mirroring can be used in network 100 for inspecting packets to resolve an issue (e.g., performance, security, etc.) without interrupting the flow of traffic in network 100. For example, switch 105 can mirror traffic arriving from switch 103 based on a condition. Switch 105 can mirror the packets arriving at an ingress port or sent via an egress port, such as port 120, traffic of a VLAN, or packet-specific features, such as protocol information or MAC and IP addresses. Switch 105 can then forward the mirrored traffic to a traffic analyzer on a target, such as a management device 110. A network administrator can then analyze events indicated in the data presented by the traffic analyzer and perform a mitigating action.

However, identifying when to initiate and terminate the mirroring process at switch 105 can be challenging. In particular, if the connection between switches 103 and 105 includes a high-speed connection, mirroring can generate a significant amount of redundant data at switch 105 even for a small period. For example, since the administrator may not have prior knowledge of an event due to the dynamic and random nature of network 100, the administrator may configure switch 105 to mirror for at least a few seconds. However, mirroring packets from a congested 10 Gbps uplink for ten seconds can produce 12.5 GB of redundant data at switch 105. Furthermore, processing such a large amount of data may cause a significant load for the processor of switch 105.

To solve this problem, hardware module 150 (e.g., the switching circuitry, such as the ASIC) of switch 105 can trigger the mirroring process. As a result, the initiation and termination of the mirroring process can be driven by the current flow of traffic through hardware module 150. Hence, based on the hardware triggers, the mirroring process can be selectively enabled and disabled traffic based on a specific event. For example, upon receiving packet 122 via port 120, the utilization of queue 130 of switch 105 can reach threshold 132. Threshold 132 can indicate the utilization level (e.g., the percentage of utilization) of queue 130 when traffic mirroring for queue 130 should be triggered. When threshold 132 is reached, hardware module 150 can trigger the mirroring of packets coming to queue 130. Traffic mirroring process 142 of switch 105 can determine the trigger event (e.g., based on an interrupt from hardware module 150) and initiate a mirror event that can mirror a set of subsequent packets 124 coming to queue 130.

Mirroring process 142 can run on processor 140, which can be included in hardware module 150, of switch 105. Mirroring process 142 can copy packets 124 and generate the copied packets to a target, such as management device 110 or processor 140. The target can run a traffic analyzer that can analyze the copied packets. When mirroring process 142 determines the expiration of the trigger condition, mirroring process 142 can terminate the mirroring event. The termination of the mirroring event can dictate the number of packets (or the volume of traffic) in packets 124. Since an event at hardware module 150 of switch 105 can trigger the mirroring process, a few subsequent packets of packet 122 can be indicative of the issue causing the event. Therefore, the duration of the traffic mirroring event can be relatively small (e.g., for a second). In this way, the hardware-triggered traffic mirroring at switch 105 can generate a relatively low volume of issue-specific mirrored data.

Figure 1B:
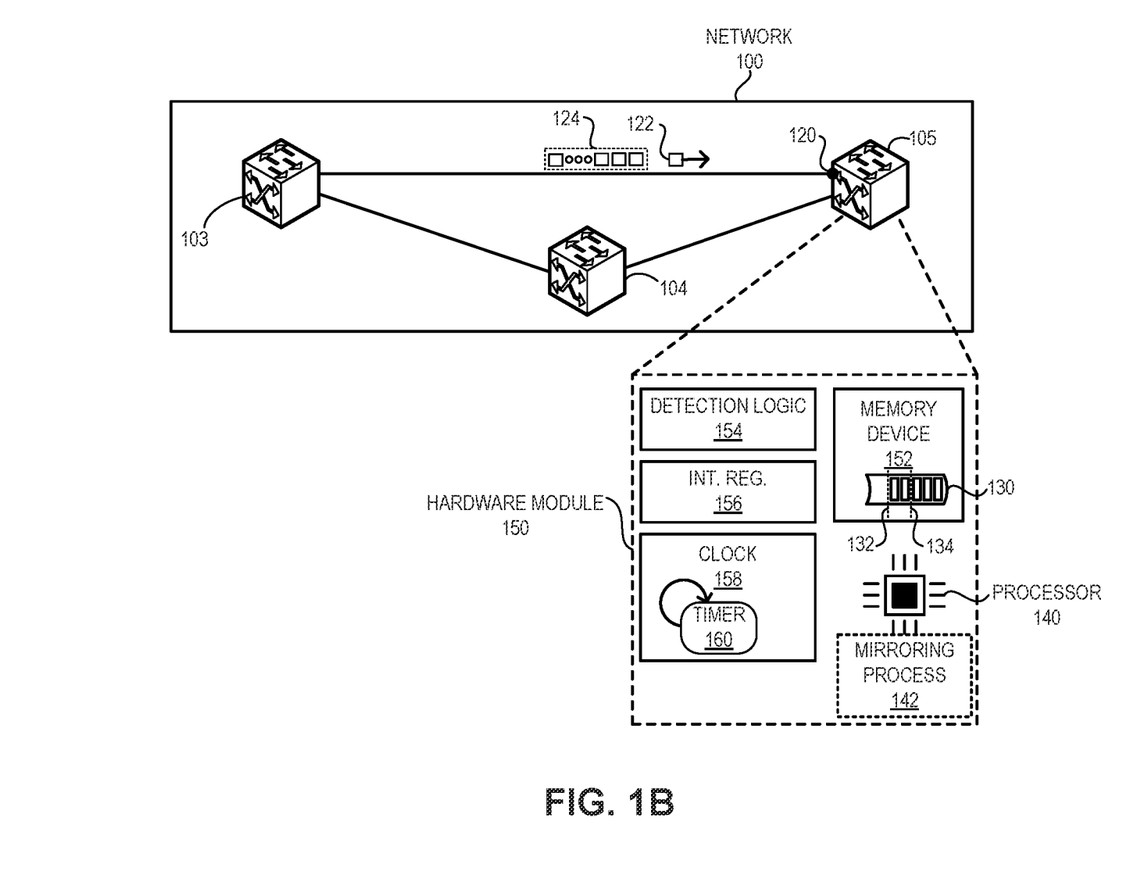
FIG. 1B illustrates examples of initiation and termination of traffic mirroring at the hardware of a switch, in accordance with an aspect of the present application.

FIG. 1B illustrates examples of initiation and termination of traffic mirroring at the hardware of a switch, in accordance with an aspect of the present application. Hardware module 150 can include a memory device 152 that can store one or more queues, such as queue 130, of switch 105. Memory device 152 can be a dedicated memory module for port 120 or shared among the ports of switch 105. Moreover, since port 120 can be a physical port of switch 105, hardware module 150 can also include port 120. Hardware module 150 can further include detection logic 154, which can monitor the corresponding states associated with different components of switch 105. Detection logic 154 can include a controller or programmable circuitry that can be configured to detect a set of trigger conditions in hardware module 150.

During operation, detection logic 154 can determine whether the state of a component has changed and whether the change of the state satisfies a trigger condition for initiating traffic mirroring associated with the component. In other words, if an event changes a state of a particular component of hardware module 150, the trigger conditions can be checked. The changed state can correspond to a performed operation at the component of hardware module 150. For example, when queue 130 receives packet 122 (i.e., performs the receiving operation), the state (i.e., the utilization) of queue 130 changes. Similarly, when port 120 learns a new MAC address (i.e., performs the learning operation), the state (i.e., the MAC table) of port 120 changes.

The changed state causes detection logic 154 to check the corresponding trigger condition. Examples of a trigger condition can include, but are not limited to, a link coupled to port 120 becoming enabled, the packet counter for port 120 reaching a threshold value, the packet rate at port 120 reaching a threshold value, port 120 learning a new MAC address, a MAC address moving to a new port, hardware module 150 learning a new IP flow, detecting a policy match (e.g., an access control list (ACL) policy enforced by hardware module 150), utilization of queue 130 reaching threshold 132, and the temperature of processor 140 reaching a threshold temperature.

A software development kit (SDK) associated with switch 105 can provide an application programming interface (API) for configuring a respective trigger condition, such as threshold 132 for queue 130. If the trigger condition is satisfied, detection logic 154 can issue an interrupt for mirroring process 142. Detection logic 154 can set a set of bits in an interrupt register 156 of hardware module 150 to indicate the mirror trigger. A trigger based on the hardware interrupt can be intercepted by processor 140. As a result, mirroring process 142, which can run based on the instructions processed at processor 140, can quickly initiate a traffic mirroring event. Accordingly, upon detecting the interrupt at interrupt register 156, mirroring process 142 can initiate a mirroring event, which mirrors packets 124 based on one or more mirroring parameters indicated by the trigger condition. The API of the SDK can be used to program a callback to mirroring process 142 when the mirror trigger is issued (e.g., the interrupt is stored in interrupt register 156).

Examples of the mirroring parameters can include, but are not limited to, the duration of the mirroring event, the number of packets in packet 124, identifying information of packets 124 (e.g., source and/or destination IP addresses), and a class of traffic associated with packets 124. Respective copies of packets 124 can be generated by switch 105 and sent to the target of the mirroring, processor 140. A respective trigger condition can be associated with a corresponding expiration of the condition. The expiration can be based on the same condition for a respective trigger condition. The expiration can also be based on different conditions for different trigger conditions.

When the trigger condition expires, mirroring process 142 can terminate the mirroring event. The expiration of the trigger condition can be indicated by the expiration of the predefined duration of the mirroring event or the detection of a termination event at hardware module 150. Hardware module 150 can include a system clock 158 for switch 105. For the time-based approach, an individual timer 160 can be maintained based on clock 158 for a respective mirroring event. Timer 160 can be a hardware timer included in hardware module 152 or a software-based timer maintained by mirroring process 142. Timer 160 can indicate the predefined duration of the corresponding mirroring event.

With the time-based approach, packets 124 can be the set of packets that arrive at port 120 for the duration. Mirroring process 142 can then mirror the traffic traversing queue 130 that may have caused an issue (e.g., congestion in queue 130) for a relatively small duration when the congestion event has occurred. On the other hand, examples of a termination event include, but are not limited to, the utilization of queue 130, the temperature of processor 140, and the packet rate at port 120 dropping below respective low watermarks. For example, mirroring for queue 130 can be terminated when the utilization of queue 130 becomes lower than a low watermark (or lower threshold) 134. Low watermark 134 can also be defined as a percentage of utilization. It should be noted that timer 160 can be different for different trigger events. Furthermore, some trigger events can expire based on timer 160 while some other trigger events may expire based on corresponding termination events.

Figure 2:
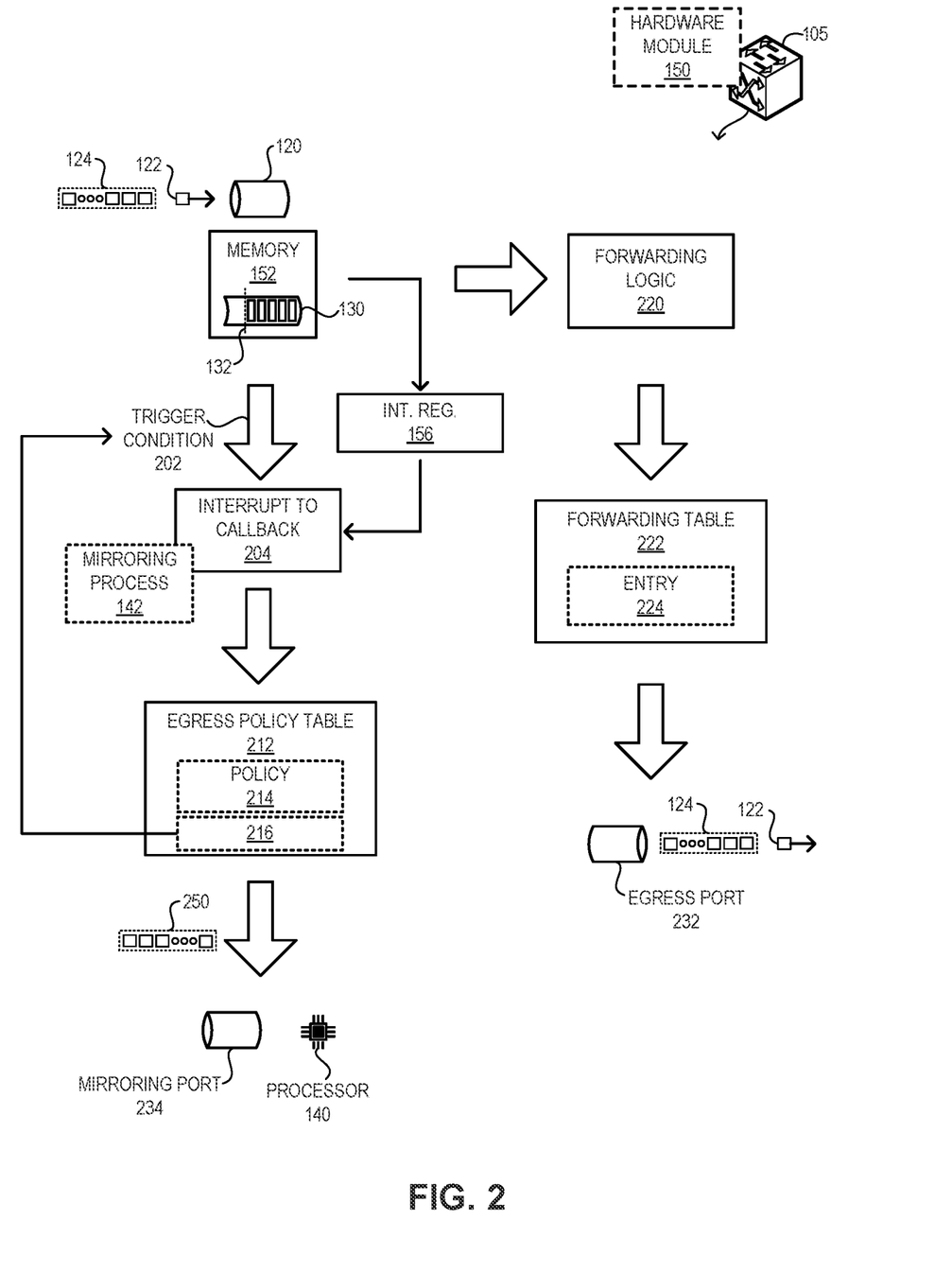
FIG. 2 illustrates an example of a hardware-triggered traffic mirroring process, in accordance with an aspect of the present application.

FIG. 2 illustrates an example of a hardware-triggered traffic mirroring process, in accordance with an aspect of the present application. Switch 105 can be equipped with a mechanism to trigger an interrupt to processor 140 if trigger condition 202 is satisfied. For example, if the utilization of queue 130 reaches a predetermined percentage level, as indicated by threshold 132, an interrupt 204 to processor 140 for initiating a callback to mirroring process 142 can be issued (e.g., in interrupt register 156). An administrator can configure trigger condition 202, such as the percentage value indicating threshold 132, using the API. The callback can then be registered in association with trigger condition 202. If an event, such as the arrival of a packet at queue 130, satisfies trigger condition 202, the callback can be executed.

In some examples, the same callback can be used for all trigger conditions in switch 105 since a respective trigger event can initiate the same mirroring process 142. However, the termination of the corresponding mirroring event can be based on the trigger condition. Mirroring process 142 can then look up an egress policy table 212 of switch 105. Table 212 can include one or more policies that can be defined using ACL. If trigger condition 202 matches a policy 214 of table 212, mirroring process 142 can determine how to mirror packets 124 based on policy 214. Table 212 can also include one or more policies, such as policy 216, to indicate a trigger condition. For example, policy 216 can indicate that if a packet with a particular IP address arrives at a port, traffic mirroring should be initiated at that port.

Mirroring process 142 can then send mirrored packets 250, which are respective copies of packets 124, to a target (e.g., based on policy 214). The target can be a mirroring port 234, which can provide reachability to a management device, or processor 140. In addition to mirroring, packets 124 are also forwarded by forwarding logic 220 of switch 105. Forwarding logic 220 can include a content-addressable memory (CAM) that can store a forwarding table 222. Forwarding logic 220 can look up the destination address of packet 122 and a respective packet in packets 124 in forwarding table 222 and identify a corresponding forwarding entry, such as entry 224. Based on the entry, forwarding logic 220 can determine an egress port 232 and forward the packet.

Figure 3A:
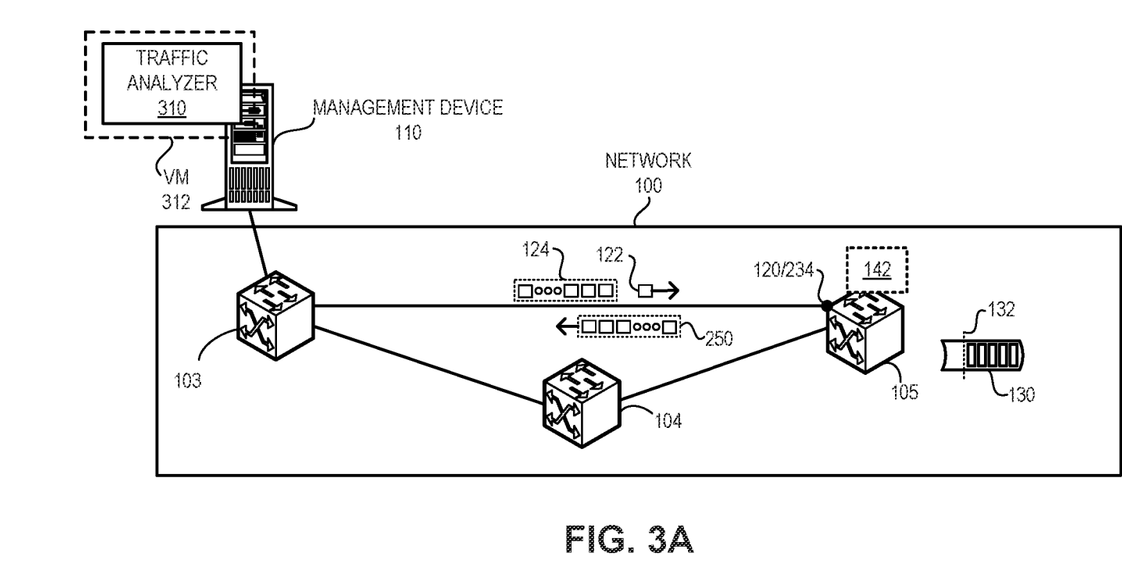
FIG. 3A illustrates an example of hardware-triggered traffic mirroring to a remote target, in accordance with an aspect of the present application.

FIG. 3A illustrates an example of hardware-triggered traffic mirroring to a remote target, in accordance with an aspect of the present application. When switch 105 receives packet 122 via port 120 and stores it in queue 130, the utilization of queue 130 can reach threshold 132. Mirroring process 142 can then mirror subsequent packets 124 via a mirroring port 234. Here, ingress port 120 and mirroring port 234 can be the same physical port of switch 105. Accordingly, mirroring process 142 can send mirrored packets 250 via mirroring port 234 to management device 110. A traffic analyzer 310 can execute on management device 110 for facilitating extensive analysis of packets 250. Management device 110 may run a virtual machine (VM) 312, which can be tasked to run traffic analyzer 310 and present the analysis to a user.

Figure 3B:
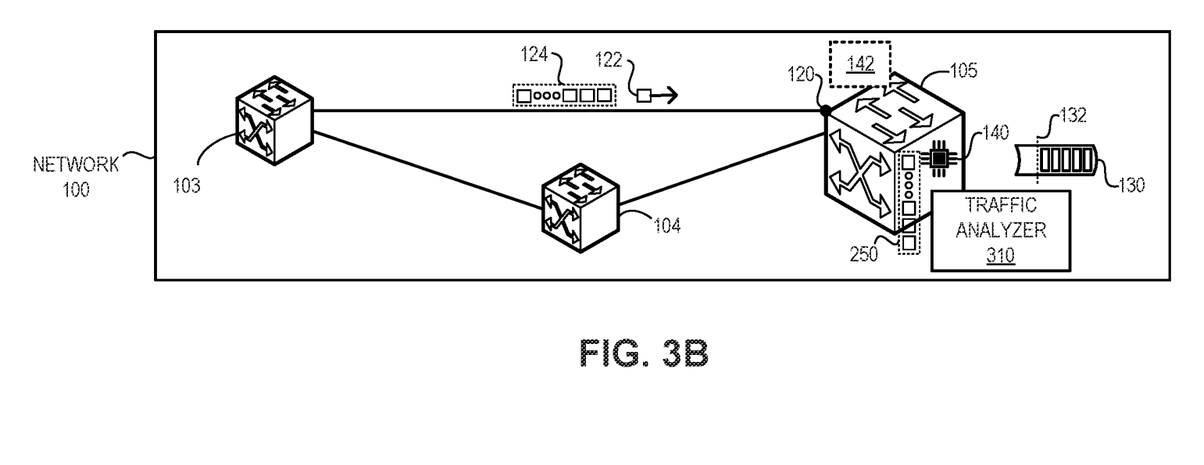
FIG. 3B illustrates an example of hardware-triggered traffic mirroring to a local target, in accordance with an aspect of the present application.

Switch 105 can also support local traffic mirroring. FIG. 3B illustrates an example of hardware-triggered traffic mirroring to a local target, in accordance with an aspect of the present application. Instead of forwarding packets 250 to a remote destination, packets 250 can be mirrored to processor 140. In particular, since the hardware-triggered mirroring can allow effective analysis of an issue with a low volume of traffic, mirrored packets 250 can be analyzed by traffic analyzer 310 running on processor 140 without significantly impacting the performance of switch 105. Alternatively, packets 250 can be promoted to processor 140 by removing the layer-2 headers. The respective IP headers of packets 250 can then be processed by processor 140. Packets 250 can then be forwarded to a remote device over an IP network (e.g., external network 114 in FIG. 1A).

Figure 4A:
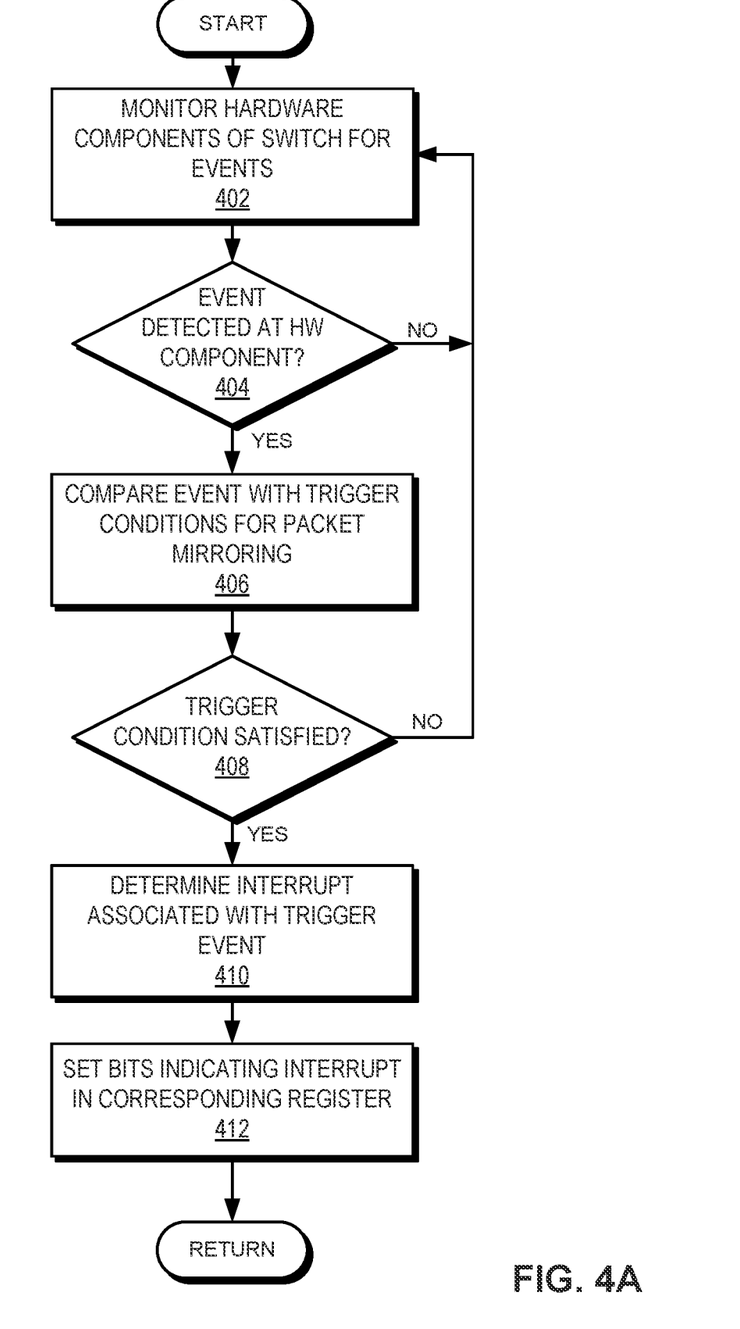
FIG. 4A presents a flowchart illustrating the process of the hardware module of a switch triggering traffic mirroring, in accordance with an aspect of the present application.

FIG. 4A presents a flowchart illustrating the process of the hardware module of a switch triggering traffic mirroring, in accordance with an aspect of the present application. During operation, the hardware module can monitor the hardware components of the switch for events (operation 402). Examples of the hardware components can include, but are not limited to, a queue (e.g., maintained in a memory device), a physical port, a network address table (e.g., any table that stores a network address, such as a MAC address, an IP address, and an IP prefix), and a processor. The hardware module can then determine whether an event is detected at a hardware component, such as the arrival of a packet at a queue (operation 404). If an event is detected, the hardware module can compare the event with the trigger conditions for packet mirroring (operation 406).

The hardware module can then determine whether a trigger condition for packet mirroring is satisfied by the event (operation 408). If an event is not detected (operation 404) or a trigger condition is not satisfied (operation 408), the hardware module can continue to monitor the hardware components of the switch for events (operation 402). On the other hand, if a trigger condition for packet mirroring is satisfied, the hardware module can determine an interrupt associated with the trigger event (operation 410). Since each trigger event may lead to packet mirroring, the same interrupt can be used for a respective trigger event. The hardware module can then set the bits indicating the interrupt in a corresponding interrupt register (operation 412).

Figure 4B:
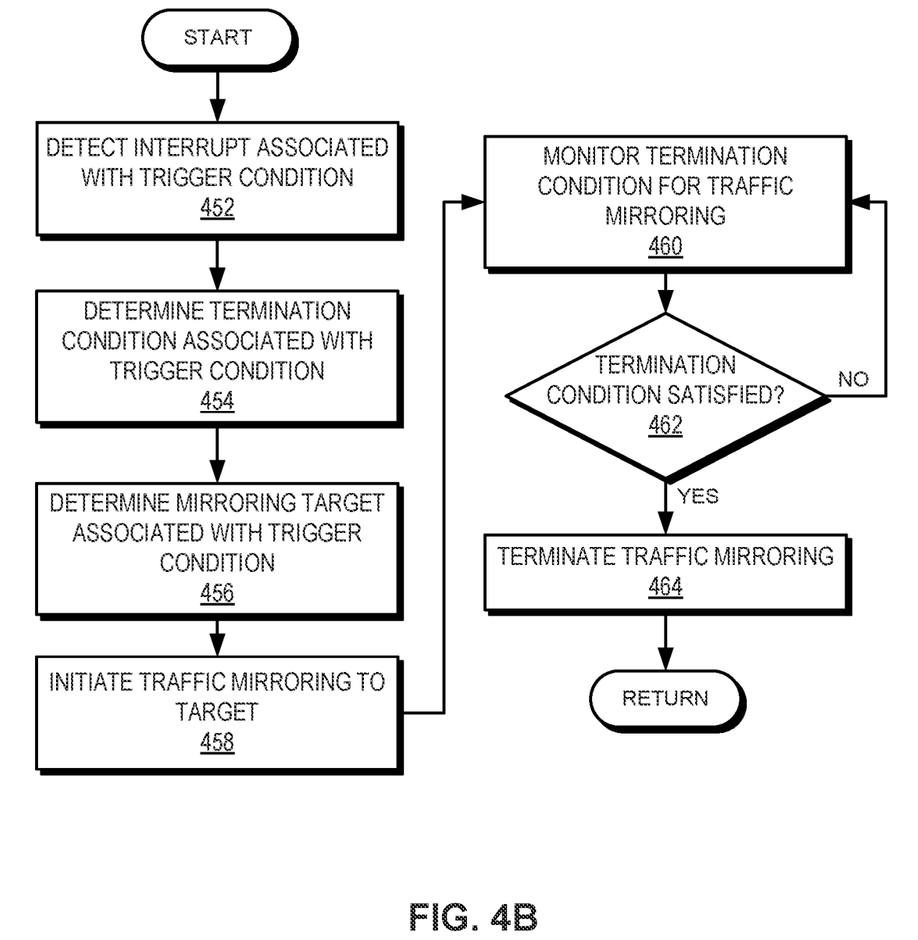
FIG. 4B presents a flowchart illustrating the process of the mirroring process of a switch initiating the operations of hardware-triggered traffic mirroring, in accordance with an aspect of the present application.

FIG. 4B presents a flowchart illustrating the process of the mirroring process of a switch initiating the operations of hardware-triggered traffic mirroring, in accordance with an aspect of the present application. During operation, the mirroring process can detect an interrupt associated with a trigger condition (operation 452). The mirroring process can detect the interrupt based on a callback configured for the interrupt. The mirroring process can then determine a termination condition associated with the trigger condition (operation 454) and determine a mirroring target associated with the trigger condition (e.g., based on a policy table) (operation 456).

Subsequently, the mirroring process can initiate the traffic mirroring to the target (operation 458) and monitor the termination condition for traffic mirroring (operation 460). The termination condition can be associated with the trigger condition and can be different for different trigger conditions. The mirroring process can determine whether a termination condition is satisfied (operation 462). If a termination condition is not satisfied, the mirroring process can continue to monitor the termination condition (operation 460). On the other hand, if a termination condition is satisfied, the mirroring process can terminate traffic mirroring (operation 464).

Figure 5:
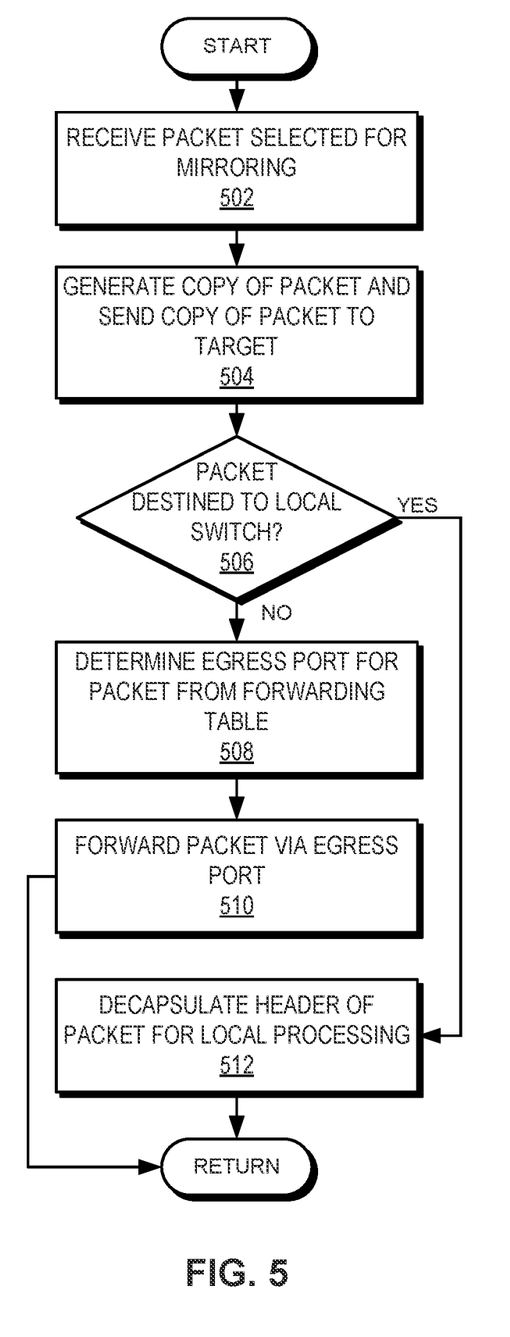
FIG. 5 presents a flowchart illustrating the process of the forwarding process of a switch performing hardware-triggered traffic mirroring, in accordance with an aspect of the present application.

FIG. 5 presents a flowchart illustrating the process of the forwarding process of a switch performing hardware-triggered traffic mirroring, in accordance with an aspect of the present application. During operation, the forwarding process can receive a packet selected for mirroring (operation 502). The forwarding process can then generate a copy of the packet and send the copy of the packet to the target (operation 504). The mirroring process can determine whether the packet is destined to the local switch (operation 506). If the packet is destined to the local switch (e.g., the destination address of the packet is allocated to the switch), the forwarding process can decapsulate the header of the packet for local processing (operation 512).

On the other hand, if the packet is not destined to the local switch (e.g., the destination address of the packet is allocated to a remote device), the forwarding process can determine an egress port for the packet from the forwarding table (operation 508). The egress port can be determined by looking up the destination address of the packet in the forwarding table from a CAM. The forwarding process can then forward the packet via the egress port (operation 510). The forwarding process can continue this process for a respective packet selected for mirroring.

Figure 6:
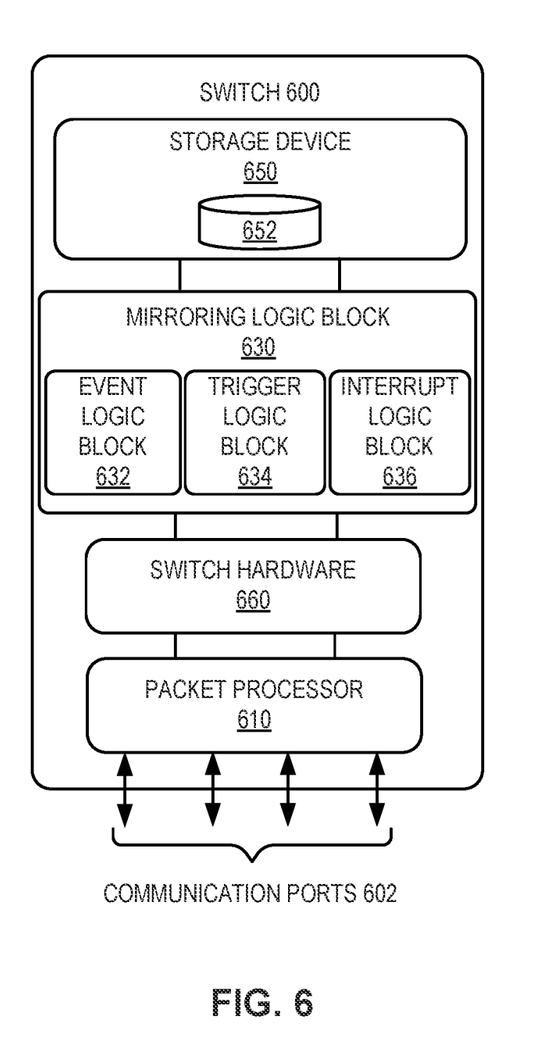
FIG. 6 illustrates an example of a switch supporting hardware-triggered traffic mirroring, in accordance with an aspect of the present application.

FIG. 6 illustrates an example of a switch supporting the remote reachability check, in accordance with an aspect of the present application. In this example, a switch 600 can include a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). In other words, switch hardware 660 includes switching circuitry for switch 600. Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Switch 600 can include a mirroring logic block 630 that can facilitate hardware-triggered traffic mirroring at switch 600. Mirroring logic block 630 can include an event logic block 632, a trigger logic block 634, and an interrupt logic block 636. Mirroring logic block 630 can allow a network administrator to configure one or more mirroring conditions for switch 600.

Event logic block 632 can monitor and detect events associated with a respective component of switch hardware 660. Tigger logic block 634 can determine whether an event satisfies a trigger condition at a hardware component. Interrupt logic block 636 can issue an interrupt for initiating a traffic mirroring event if a trigger condition is satisfied. Trigger logic block 634 can then determine whether a termination condition for the packet mirroring event.

One aspect of the present technology can provide a system for facilitating packet mirroring triggered by a hardware module of a switch. During operation, the hardware module can process a received packet and determine whether the processing of the packet changes a state of the hardware module. If a change to the state is detected, the hardware module can determine whether the changed state of the hardware module satisfies a trigger condition for initiating packet mirroring. If the trigger condition is satisfied, the hardware module can issue a hardware interrupt for traffic mirroring. The system can then identify a set of packets that are to be mirrored based on one or more mirroring parameters indicated by the trigger condition. Here, the set of packets are subsequent to the packet and to be processed by the hardware module. The system can mirror the set of packets to a target by sending a copy of a respective packet in the set of packets to the target. If the trigger condition is expired, the system can terminate the mirroring of the set of packets.

In a variation on this aspect, the monitoring parameters can include one or more of: a duration for the mirroring of the set of packets, a number of packets to be mirrored, identifying information of the set of packets, and a class of traffic associated with the set of packets.

In a further variation, the identifying information of a respective mirrored packet can include one or more of: an ingress or egress port of the mirrored packet, a virtual local area network (VLAN) identifier of the mirrored packet, a media access control (MAC) address of the mirrored packet, and an Internet Protocol (IP) address of the mirrored packet.

In a variation on this aspect, the target can include one of: a remote device reachable via a mirroring port and a processor of the switch.

In a variation on this aspect, the trigger condition includes one or more of: a link coupled to a port of the switch becoming enabled, a packet counter for the port reaching a first threshold value, a packet rate at the port reaching a second threshold value, the port learning a MAC address, the port detecting a MAC address movement, the switch learning an IP flow, detecting a policy match in a policy table of the switch, utilization of a queue of the switch reaching a third threshold value; and temperature of a processor of the switch reaching a fourth threshold.

In a variation on this aspect, the expiration of the trigger condition can be based on one of: the expiration of a predetermined mirroring period and the detection of a second trigger condition.

In a variation on this aspect, the hardware interrupt can indicate that the trigger condition is satisfied and can correspond to a callback to a mirroring process of the switch.

In a further variation, the mirroring process executes on a processor of the switch and is initiated based on the callback.

In a variation on this aspect, the hardware module can store the hardware interrupt in an interrupt register of the switch. Here, the hardware interrupt can be interceptable by a processor of the switch.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
processing a received packet by forwarding hardware of a network device;
determining whether the processing of the received packet changes a state of the forwarding hardware, wherein the changed state corresponds to a performed operation at the forwarding hardware;
in response to determining a change to the state, determining, by the forwarding hardware, whether the change of the state of the forwarding hardware satisfies a trigger condition in the forwarding hardware for initiating packet mirroring;
in response to determining that the trigger condition is satisfied, issuing, by the forwarding hardware, a hardware interrupt to be intercepted by a processor of the network device for initiating traffic mirroring at the network device, wherein issuing the hardware interrupt to be intercepted by the processor comprises updating an interrupt register to include an interrupt configured to cause a mirroring process to initiate a mirroring event;
identifying, after the hardware interrupt is issued and by the mirroring process executing on the processor, a set of packets that are to be mirrored based on one or more mirroring parameters indicated by the trigger condition, wherein the set of packets are subsequent to the packet and to be processed by the forwarding hardware;
mirroring the set of packets to a target by sending a copy of a respective packet in the set of packets to the target; and
in response to determining expiration of the trigger condition, terminating the mirroring of the set of packets, wherein:
the expiration of the trigger condition comprises a passage of an amount of time indicated by a predefined duration of the mirroring event, and
the predefined duration is one of the mirroring parameters indicated by the trigger condition.

2. The method of claim 1, wherein the mirroring parameters further include one or more of: a number of packets to be mirrored, identifying information of the set of packets, and a class of traffic associated with the set of packets.

3. The method of claim 2, wherein the identifying information of a respective mirrored packet of the set of mirrored packets includes one or more of:
an ingress or egress port of the respective mirrored packet;
a virtual local area network (VLAN) identifier of the respective mirrored packet;
a media access control (MAC) address of the respective mirrored packet; and
an Internet Protocol (IP) address of the respective mirrored packet.

4. The method of claim 1, wherein the target includes one of:
a remote device reachable via a mirroring port; and
the processor of the network device.

5. The method of claim 1, wherein the trigger condition includes one or more of:
a link coupled to a port of the network device becoming enabled;
a packet counter for the port reaching a first threshold value;
a packet rate at the port reaching a second threshold value;
the port learning a MAC address;
the port detecting a MAC address movement;
the network device learning an IP flow;
detecting a policy match in a policy table of the network device;
utilization of a queue of the network device reaching a third threshold value; and
a temperature of the processor of the network device reaching a fourth threshold.

6. The method of claim 1, wherein the expiration of the trigger condition further comprises:
detection of a second trigger condition.

7. The method of claim 1, wherein the hardware interrupt indicates that the trigger condition is satisfied and corresponds to a callback to the mirroring process of the network device.

8. The method of claim 7, wherein the mirroring process executes on the processor of the network device and is initiated based on the callback.

9. A network device, comprising:
a processor;
a forwarding hardware comprising switching circuitry configured to:
process a received packet;
determine whether the processing of the received packet changes a state of the forwarding hardware;
in response to determining a change to the state, determine whether the change of the state of the forwarding hardware satisfies a trigger condition for initiating packet mirroring; and
in response to determining that the trigger condition in the forwarding hardware is satisfied, issue a hardware interrupt to be intercepted by the processor of the network device for initiating traffic mirroring, wherein issuing the hardware interrupt to be intercepted by the processor comprises updating an interrupt register to include an interrupt configured to cause a mirroring process to initiate a mirroring event; and a non-transitory computer-readable storage medium storing instructions, wherein execution of the instructions by the processor cause the processor to:

identify, after the hardware interrupt is issued and by the mirroring process executing on the processor, a set of packets that are to be mirrored based on one or more mirroring parameters indicated by the trigger condition, wherein the set of packets are subsequent to the packet and to be processed by the forwarding hardware;

mirror the set of packets to a target by sending a copy of a respective packet in the set of packets to the target; and in response to determining expiration of the trigger condition, terminate the mirroring of the set of packets, wherein:

the expiration of the trigger condition comprises a passage of an amount of time indicated by a predefined duration of the mirroring event, and the predefined duration is one of the mirroring parameters indicated by the trigger condition.

10. The network device of claim 9, wherein the mirroring parameters further include one or more of: a number of packets to be mirrored, identifying information of the set of packets, and a class of traffic associated with the set of packets.

11. The network device of claim 10, wherein the identifying information of a respective mirrored packet of the set of mirrored packets includes one or more of:

an ingress or egress port of the respective mirrored packet;

a virtual local area network (VLAN) identifier of the respective mirrored packet;

a media access control (MAC) address of the respective mirrored packet; and an Internet Protocol (IP) address of the respective mirrored packet.

12. The network device of claim 9, wherein the target includes one of:

a remote device reachable via a mirroring port; and
the processor.

13. The network device of claim 9, wherein the trigger condition includes one or more of:

a link coupled to a port of the network device becoming enabled;

a packet counter for the port reaching a first threshold value;

a packet rate at the port reaching a second threshold value;
the port learning a MAC address;
the port detecting a MAC address movement;
the network device learning an IP flow;
detecting a policy match in a policy table of the network device;

utilization of a queue of the network device reaching a third threshold value; and a temperature of a processor of the network device reaching a fourth threshold.

14. The network device of claim 9, wherein the expiration of the trigger condition further comprises:

detection of a second trigger condition.

15. The network device of claim 9, wherein the hardware interrupt indicates that the trigger condition is satisfied and corresponds to a callback to the mirroring process of the network device.

16. The network device of claim 15, wherein the mirroring process executes on the processor of the network device and is initiated based on the callback.

17. A non-transitory computer-readable storage medium storing instructions that when executed by a computer cause the computer to perform a method, the method comprising:

processing a received packet by forwarding hardware of a network device;

determining whether the processing of the received packet changes a state of the forwarding hardware;

in response to determining a change to the state, determining, by the forwarding hardware, whether the change of the state of the forwarding hardware satisfies a trigger condition for initiating packet mirroring;

in response to determining that the trigger condition is satisfied, issuing, by the forwarding hardware, a hardware interrupt to be intercepted by a processor of the network device to initiate traffic mirroring, wherein issuing the hardware interrupt to be intercepted by the processor comprises updating an interrupt register to include an interrupt configured to cause a mirroring process to initiate a mirroring event;

identifying, after the hardware interrupt is issued and by the mirroring process executing on the processor, a set of packets that are to be mirrored based on one or more mirroring parameters indicated by the trigger condition, wherein the set of packets are subsequent to the packet and to be processed by the forwarding hardware;

mirroring the set of packets to a target by sending a copy of a respective packet in the set of packets to the target; and in response to determining expiration of the trigger condition, terminating the mirroring of the set of packets, wherein:

the expiration of the trigger condition comprises a passage of an amount of time indicated by a predefined duration of the mirroring event, and the predefined duration is one of the mirroring parameters indicated by the trigger condition.

18. The non-transitory computer-readable storage medium of claim 17, wherein the hardware interrupt indicates that the trigger condition is satisfied and corresponds to a callback to the mirroring process of the network device.

* * * * *